(12) United States Patent
Thomas

(10) Patent No.: US 7,841,319 B2
(45) Date of Patent: Nov. 30, 2010

(54) METHOD OF DETECTING AND COMPENSATING FOR INJECTOR VARIABILITY WITH A DIRECT INJECTION SYSTEM

(75) Inventor: Joseph Lyle Thomas, Kimball, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/776,534

(22) Filed: May 10, 2010

(65) Prior Publication Data

US 2010/0222988 A1   Sep. 2, 2010

Related U.S. Application Data

(63) Continuation of application No. 11/744,990, filed on May 7, 2007, now Pat. No. 7,717,088.

(51) Int. Cl.
*F02M 51/06* (2006.01)
*F02M 51/00* (2006.01)
(52) U.S. Cl. ..................... 123/478; 701/103
(58) Field of Classification Search ............. 123/495, 123/478, 456, 447, 446; 701/103; 73/114.38, 73/114.41, 114.43

See application file for complete search history.

(56) References Cited

U.S. PATENT DOCUMENTS

| 4,319,327 | A | | 3/1982 | Higashiyama et al. | |
|---|---|---|---|---|---|
| 5,176,122 | A | * | 1/1993 | Ito | 123/478 |
| 5,633,458 | A | | 5/1997 | Pauli et al. | |
| 6,088,647 | A | | 7/2000 | Hemberger et al. | |
| 6,105,554 | A | * | 8/2000 | Nishiyama | 123/436 |
| 6,250,285 | B1 | * | 6/2001 | Takase | 123/456 |
| 6,349,702 | B1 | | 2/2002 | Nishiyama | |
| 6,463,910 | B2 | * | 10/2002 | Nishiyama | 123/456 |
| 6,964,261 | B2 | | 11/2005 | Warne et al. | |
| 2006/0283425 | A1 | * | 12/2006 | Tsutsui et al. | 123/478 |

FOREIGN PATENT DOCUMENTS

| EP | 1136686 | 9/2001 |
|---|---|---|
| EP | 1647695 | 4/2006 |

OTHER PUBLICATIONS

International Search Report of GB0807813.1, Jul. 16, 2008, UK Intellectual Property Office, 3 pages.

* cited by examiner

*Primary Examiner*—Mahmoud Gimie
(74) *Attorney, Agent, or Firm*—Julia Voutyras; Alleman Hall McCoy Russell & Tuttle LLP

(57) ABSTRACT

A method for controlling an injection of fuel to an engine is described. In one example, the different fuels are injected to an engine during different engine operating conditions. The method may improve engine starting and reduce engine emissions.

20 Claims, 7 Drawing Sheets

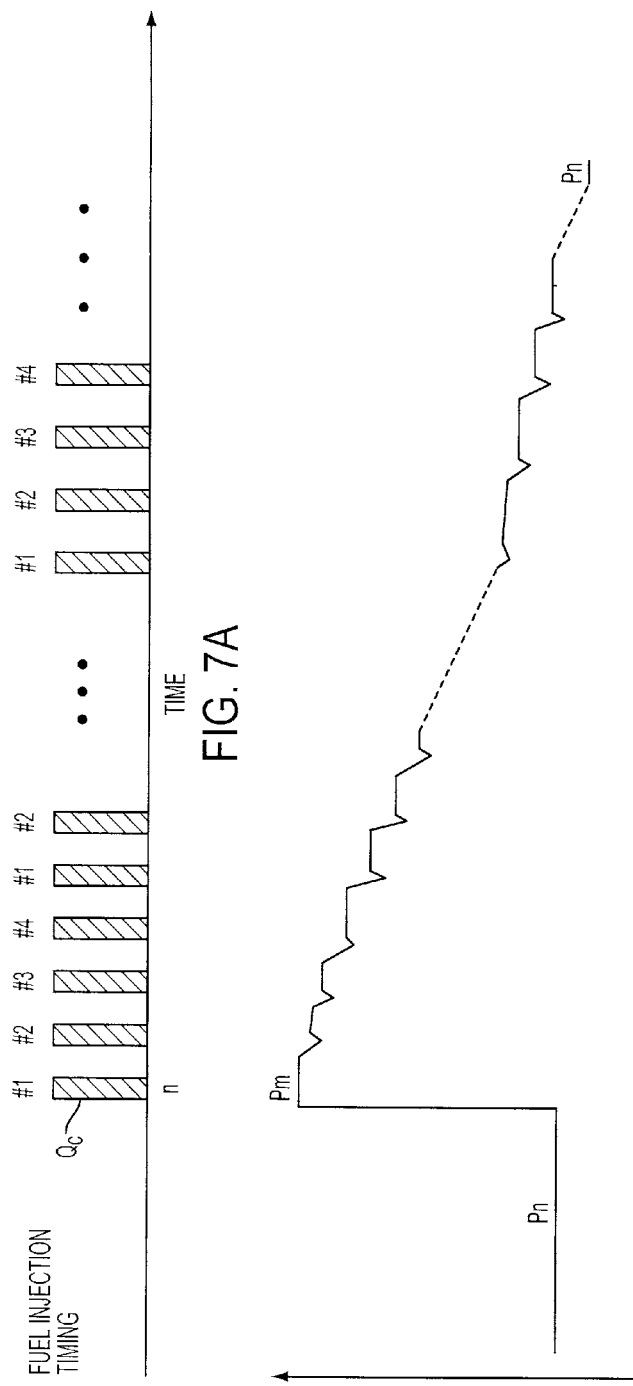
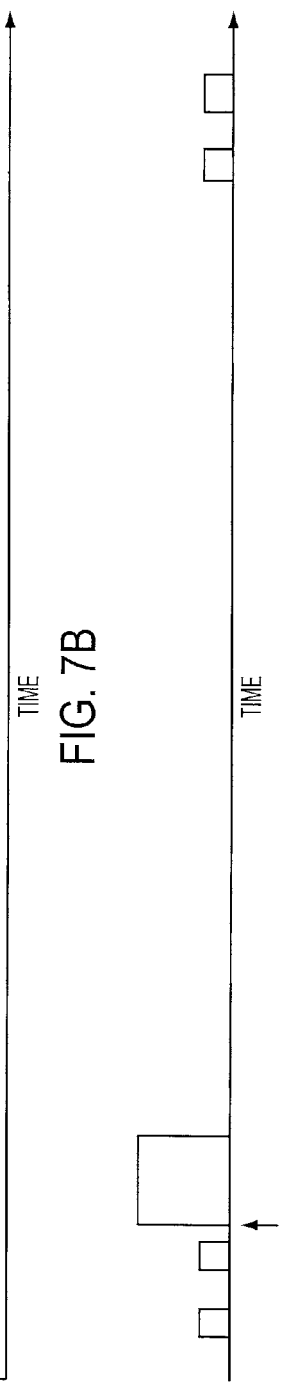
FIG. 7A
FIG. 7B
FIG. 7C

METHOD OF DETECTING AND COMPENSATING FOR INJECTOR VARIABILITY WITH A DIRECT INJECTION SYSTEM

CROSS REFERENCE TO RELATED APPLICATION

The present application is a continuation of U.S. patent application No. Ser. 11/744,990, filed May 7, 2007, entitled "METHOD OF DETECTING AND COMPENSATING FOR INJECTOR VARIABILITY WITH A DIRECT INJECTION SYSTEM", the entire contents of each of which are incorporated herein by reference.

BACKGROUND AND SUMMARY

Fuel injectors of direct injection engine systems often have piece-to-piece and time-to-time variability, due to imperfect manufacturing processes and/or injector aging, for example. This injector variability may cause cylinder torque output imbalance due to the different amount of fuel injected into each cylinder, and may also cause higher tail pipe emission and reduced fuel economy due to an inability to correctly meter the fuel to be injected into each cylinder.

To compensate for injector variability, correction coefficients that correct for injection parameters, such as injection time, may be used. For example, U.S. Pat. No. 5,176,122 discloses a method that utilizes both average correction coefficients and individual correction coefficients to correct for injector variability. To calibrate the average and individual correction coefficients, calibration injection events are carried out while the fuel supply is stopped during various conditions, such as idling. Specifically, during a calibration injection event, the fuel rail pressure is monitored as it falls from a normal operating pressure to a lower threshold as fuel injections are carried out. The fuel rail pressure drop is then used to calculate and update correction coefficients. Further, in order to identify individual correction coefficients, injection events of some injectors may be carried out, while other injectors are disabled or have their injection quantity reduced.

The inventors herein have recognized some potential issues associated with the above methods of calibrating correction coefficients. For example, during a calibration injection event, the fuel rail pressure drop is monitored from a normal operating pressure to a lower threshold pressure, since the lower threshold pressure may be limited by the inability of injectors to accurately meter fuel below a certain pressure, the amount of pressure drop available for a given calibration injection event may therefore be limited. In other words, the number and size of injections for a given calibration injection event may not be sufficient to accurately calibrate all injectors. In addition to be above issue, the individual cylinder injector calibration using injector deactivation can result in undesirable air-fuel ratio excursions, un-even torque production from cylinder to cylinder, and increased engine vibration (such as during idle conditions). Furthermore, when fuel rail pressure is maintained at normal operating pressures, a relatively small amount of fuel may be present in the fuel rail during calibration due to the relatively low fuel pressure. As such, the small amount of fuel present in the fuel rail may increase fuel metering sensitivity to engine heat, which may in turn degrade calibration results.

To address at least some of the above issues, a fuel injection system that utilizes low engine load operating conditions and a higher than normal operating fuel rail pressure for injector calibration may be used.

In one example, a method for controlling fuel injection of a direct injection fuel system, the fuel system having a fuel pump, the method comprising: variably operating the fuel pump to maintain a fuel pressure at a selected pressure; temporarily increasing pump operation to increase pressure sufficiently above said selected pressure and then reducing pump operation; during at least a fuel injection subsequent to the reduction in pump operation, correlating pressure decrease to injector operation, and adjusting fuel injection operation based on the correlation.

By using an increased pressure beyond the selected operating pressure, it is possible to have sufficiently large injection quantities to sustain sufficient fuel rail pressure drop with the subsequent injections for accurate injector calibration. This may especially be true when using a turbocharger to boost intake air pressure, in which case injection pressure must overcome the boosted air pressure in the cylinder. Additionally, it may also be possible to have sufficient number of calibration injections when a multitude injection per injector is desired for accurate calibration and/or multiple injectors need to be calibrated. Furthermore, it may also be possible to avoid or reduce operating injectors at pressures below that appropriate for the current operating conditions. In one particular example, by carrying out such operation during lower load conditions, it is possible to provide sufficient pressure increase for injector calibration, since lower operating pressures may be used at such lower load conditions, i.e., the operating pressure (before the temporary pressure increase for calibrating injectors) is low enough to provide sufficient room to achieve a desired pressure increase to carry out accurate injector calibration.

Furthermore, by using a higher starting fuel rail pressure during the correlation, the fuel rail can be filled with fresher and colder fuel while the fuel injector is calibrated. This may reduce the fuel rail temperature sensitivity, and thus increase correlation results.

Finally, in an example where a predetermined number of injections for each injector in the engine are performed subsequent and proximate to the reduction in pump operation, it may be possible to avoid any torque imbalance produced when a single injector is disabled or the injection volume of a single injector is reduced.

BRIEF DESCRIPTION OF FIGURES

FIG. 7 is a time chart illustrating fuel injection timing, fuel pressure change in the high pressure reserve tank, and fuel pump strokes for a calibration injection cycle.

DETAILED DESCRIPTION

Figure 1:
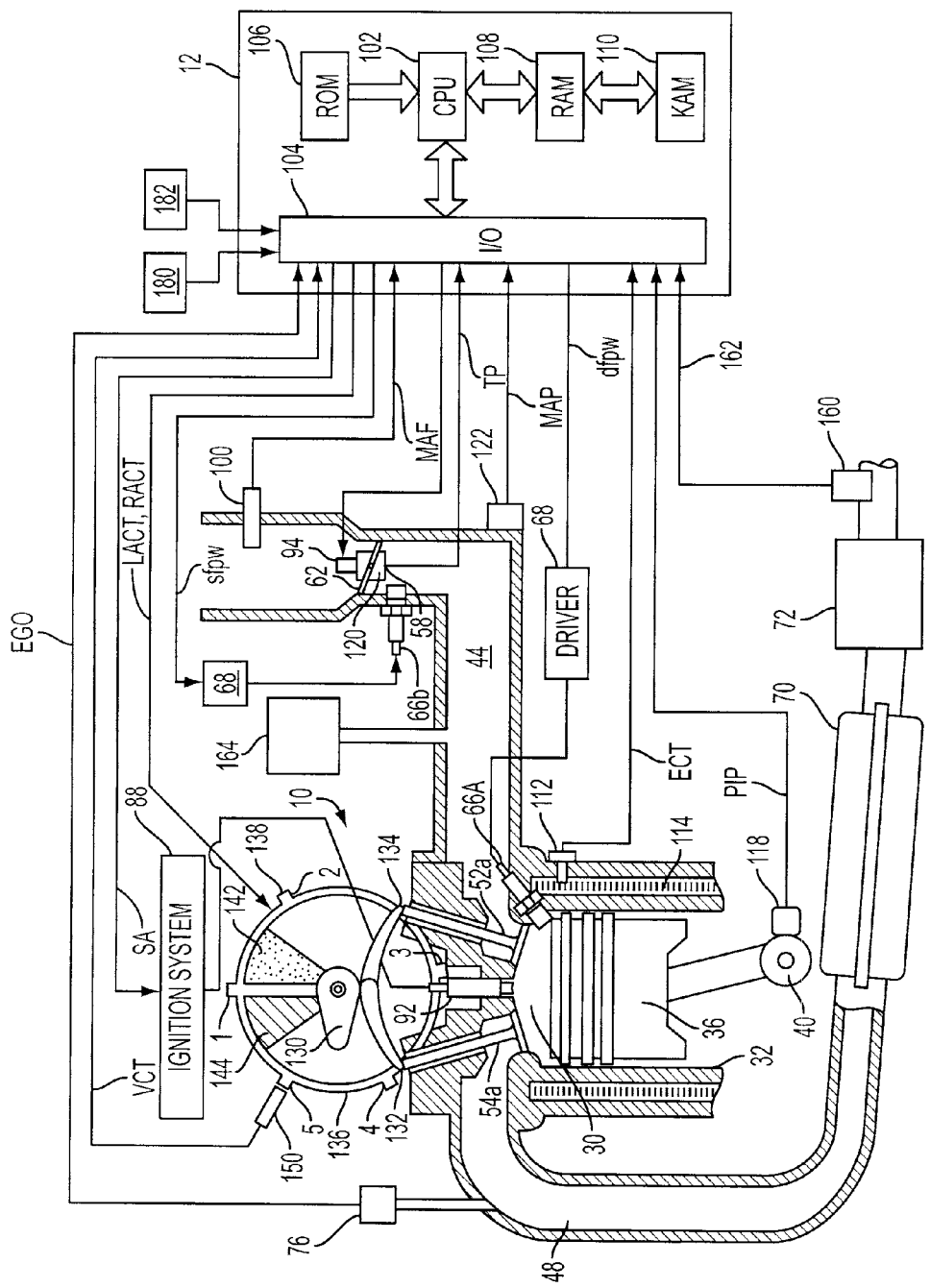
FIG. 1 illustrates an exemplary engine.

FIG. 1 shows one cylinder of a multi-cylinder engine, as well as the intake and exhaust path connected to that cylinder.

Continuing with FIG. 1, it shows a direct injection system, where engine 10 has direct fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. In some examples, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (See FIG. 2) including a fuel tank, fuel pumps, and a fuel rail. Further, while not shown, the fuel tank (or tanks) may (each) have a pressure transducer providing a signal to controller 12.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative example (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating injector 66A during an intake stroke (which may be open valve injection). In yet another example, a homogenous mixture may be formed by operating injector 66A before an intake stroke (which may be closed valve injection). In still other examples, multiple injections from injector 66A \may be used during one or more strokes (e.g., intake, compression, exhaust, etc.). Even further examples may be where different injection timings and mixture formations may be used under different conditions.

Controller 12 can control the amount of fuel delivered by fuel injectors 66A, so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a particulate filter, a three-way catalyst, or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft. Temperature of the catalytic converters may be measured from sensors or estimated based on operating conditions, or combinations thereof.

In some examples, controller 12 receives various sensed operating parameters that may affect fuel rail pressure monitoring are sensed through various sensors (not all shown). The operating parameters may be correlated to the fuel rail pressure drop during injector calibration injection events and the effect of the engine operating parameters on the fuel rail pressure measurements may be removed or discounted so that the fuel pressure drops attributed to fuel injections can be accurately determined. Such engine parameters that may influence fuel pressure measurements include for example intake and/or exhaust valve positions, crank angle position, piston position, firing of injector, firing of spark ignition, and/or intake and/or exhaust pressure.

Continuing with FIG. 1, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of air-fuel ratio in the exhaust gas via signal 162, which provides controller 12 a voltage indicative of the O2 concentration. For example, sensor 160 can be a HEGO, U EGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and that each cylinder has its own set of intake/exhaust valves, fuel injectors, spark plugs, etc.

Also, in the example described herein, the engine 10 may be coupled to a starter motor (not shown) for starting the engine. The starter motor may be powered when the driver turns a key in the ignition switch on the steering column or actuates an automatic starting button, for example. The starter is disengaged after engine starting, for example, by engine 10 reaching a predetermined speed after a predetermined time. Further, in the disclosed examples, an exhaust gas recirculation (EGR) system may route a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 may be one or more various types of internal combustion engines. The engine 10 may contain various numbers of cylinders, for example, it may be a JV-2, V-6, V-8, or V-12 engine. Individual cylinders may be individually activated or deactivated to provide different engine displacement. Individual cylinders may also be operated in different combustion modes at a given time. It is also possible that individual cylinders may transition between different combustion modes, for example from SI to HCCI and then back to SI. The engine 10 may be a rotary-piston engine or a reciprocating piston engine or a combination of rotary-piston and reciprocating piston engine. The engine 10 may also burn various types of fuels, such as diesel, vegetable oil, propane, gasoline, or a combination of different fuels. Additionally, the internal combustion engine may use different stroke cycles, for example it may use a two-stroke or a four-stroke cycle or a combination of different stroke cycle. The cylinders of the engine may be laid out in various configurations. For example, the cylinders may be arranged in a line as in in-line engines, arranged in a v configuration as in v engines, arranged in w configuration as in w engines, arranged into two opposing banks of cylinders as in flat engines, or a combination of different engine configurations.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders.

Engine 10 may further include a compression device such as a turbocharger or supercharger (not shown) including at least a compressor arranged along intake manifold 44. For a turbocharger, a compressor may be at least partially driven by a turbine (e.g. via a shaft) arranged along exhaust passage 48. For a supercharger, the compressor may be at least partially driven by the engine (e.g., crankshaft) and/or an electric machine, and may not include a turbine. The turbocharger, if present, may be of various types of turbochargers, for example, it may be a fixed geometry turbocharger or it may be a variable geometry turbocharger. Further, it may be a variable nozzle turbocharger or include a bypass waste gate.

Figure 2:
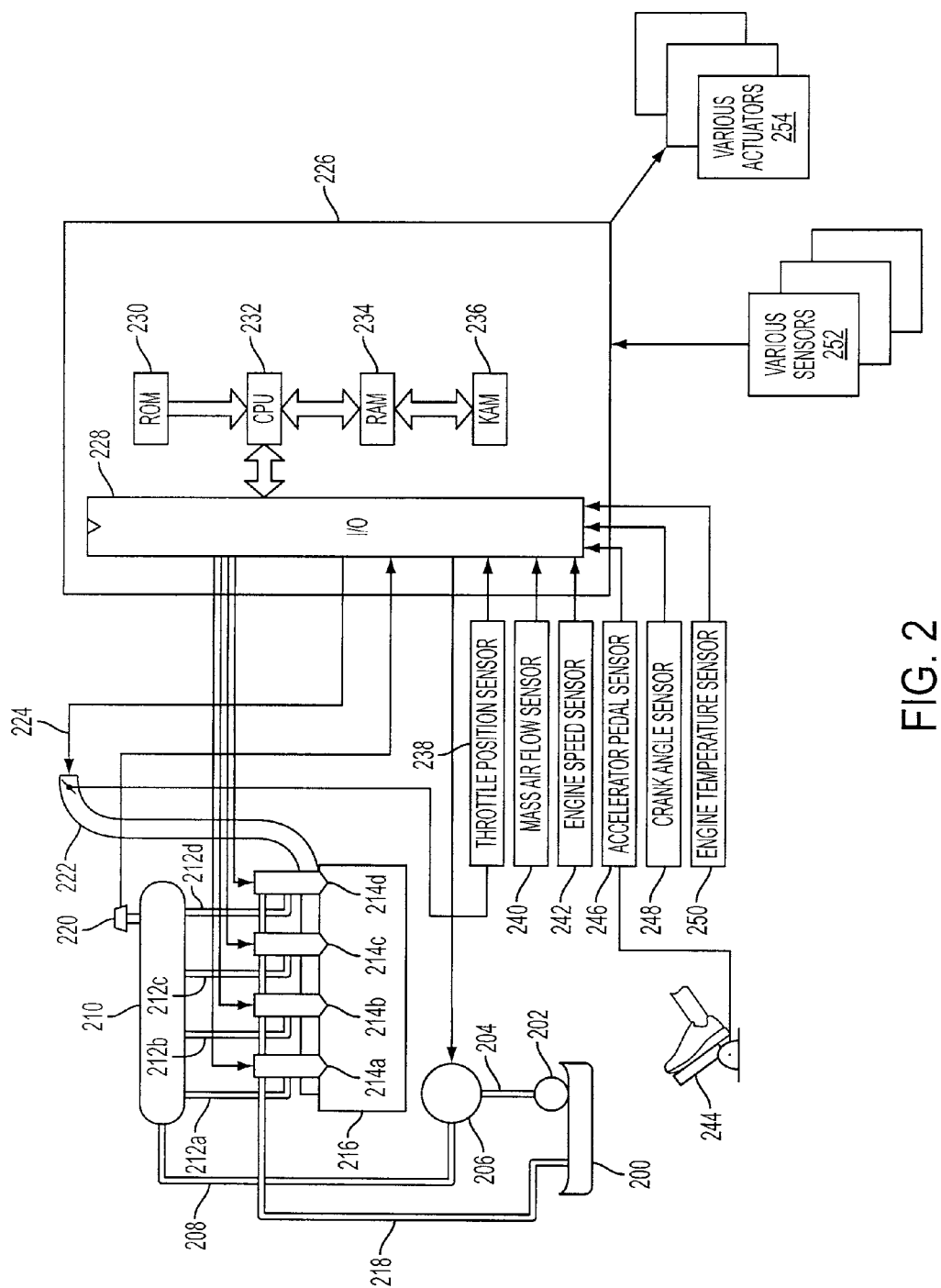
FIG. 2 illustrates a fuel injection system with a high pressure fuel.

FIG. 2 illustrates a fuel injection system with a high pressure fuel rail system. The system may include a fuel tank 200, a low pressure (or lift) fuel pump 202 that supplies fuel from the fuel tank 200 to a high pressure fuel pump 206 via a low pressure passage 204. The high pressure fuel pump 206 supplies pressurized fuel to the high pressure fuel reserve 210 via a high pressure passage 208. The high pressure fuel reserve 210 supplies pressurized fuel to fuel injectors 214a, 214b, 214c, and 214d via fuel supply passages 212a, 212b, 212c, and 212d, respectively. The fuel injectors inject fuels into engine cylinders (not shown) located in an engine block 216. Un-injected fuel may be returned to the fuel tank 200 via a fuel return passage 218. The engine block 216 may be coupled to an intake pathway 222 with an intake air throttle 224.

The system may further include a control unit 226. The control unit may be further coupled to various other sensors 252 and various actuators 254 (e.g., fuel injection actuator, spark ignition actuator, throttle valve actuator, etc) for sensing and controlling vehicle operating conditions. For example, the control unit 226 may sense engine speed, throttle position, intake temperature and/or pressure, exhaust temperature/pressure, mass air flow, engine coolant temperature, crank angle position, variable cam position, injection timing, spark ignition timing through appropriate sensors. The control unit 226 may also control operations of intake and/or exhaust valves or throttles, engine cooling fan, spark ignition, injector, and fuel pumps to control engine operating conditions.

FIG. 2 shows additional details of the fuel injection system. Specifically, FIG. 2 shows control unit 216, which may be an engine control unit, powertrain control unit, control system, a separate unit, or combinations of various control units. The control unit 226 is shown in FIG. 2 as a microcomputer, including an input/output (I/O) port 228, a central processing unit (CPU) 232, an electronic storage medium for executable programs and calibration values shown as read only memory (ROM) chip 230 in this particular example, random access memory (RAM) 234, keep alive memory (KAM) 136, and a data bus.

The control unit 226 may receive signals from various sensors. For example, the control unit 226 may receive fuel pressure signals from the high pressure fuel reserve 210 via a fuel pressure sensor 220 located in the high pressure fuel reserve 210. The control unit may further receive throttle opening angle signals ($O_A$) indicating the intake air throttle position via a throttle position sensor 238, intake air flow signals ($Q_a$) from a mass air flow sensor 240, engine speed signals ($N_e$) from engine speed sensor 242, accelerator pedal position signal from a pedal 244 via an accelerator pedal position sensor 246, crank angle sensor 248, and engine coolant temperature (ECT) signals from engine temperature sensor 250.

Additional to the signals mentioned above, the control unit 226 may also receive other signals from various other sensors 252. For example, the control unit 226 may receive a profile ignition pickup signal (PIP) from a Hall effect sensor (not shown) coupled to a crankshaft (not shown); manifold pressure signal MAP from a manifold pressure sensor (not shown).

The control unit 226 may control operations of various vehicular components via various actuators 254. For example, the control unit 226 may control the operation of the fuel injectors 214a-b through a fuel injector actuator (not shown) and high pressure fuel pump 206 through a high pressure fuel pump actuator (not shown).

Although one high pressure fuel pump 206 is provided in this example, in other examples it may be possible to have multiple high pressure fuel pumps that supply fuel to the high pressure fuel reserve 210. The high pressure fuel pump 206 may be coupled to and controlled by the control unit 226 as is shown here in FIG. 2. The control unit 226 may regulate may regulate the amount or speed of fuel to be fed into the high pressure reserve by the high pressure fuel pump 206 through a high pressure fuel pump control (not shown). The control unit 226 may also completely stop fuel supply to the high pressure fuel reserve 210. Furthermore, the high pressure fuel pump 206 may contain one or more relief valves that decrease the fuel pressure in the high pressure fuel reserve when the fuel pressure in the high pressure fuel reserve 210 is higher than that is desired.

Although one fuel injector per cylinder is provided in this example, multiple injectors per cylinder may be provided in other examples. Although the injectors are coupled to engine cylinder in this example, in other examples, the injectors may be coupled to an intake pathway. The fuel injectors that are directly coupled to engine cylinders may be located overhead of cylinder pistons (not shown) or located on the side of an engine cylinder. The injector 212 may be operatively coupled to and controlled by a control unit, such as the control unit 226 as is shown here in FIG. 1. An amount of fuel injected from the injector and the injection timing may be determined by the control unit 226 from an engine map stored in the control unit 226 on the basis of engine speed ($N_e$) and/or intake throttle angle ($Q_A$), or engine load. The injector may be controlled via controlling an electromagnetic valve coupled to the injector (not shown). The injector may not inject all the fuel supplied to the injector and may return part of the fuel supplied to the fuel tank through a return path, such as the return passage 218.

The high pressure fuel reserve 210 may also contain one or more temperature sensors for sensing the fuel temperature in the high pressure fuel reserve 210 and one or more pressure sensors for sensing the fuel pressure in the high pressure fuel reserve 210. It may also contain one or more relief valves that when opened decrease the pressure in the high pressure fuel reserve when it is above that is desired and return extra fuel back to the fuel tank via a fuel return passage.

Various other modifications or adjustments may be made to the above example systems. For example, the fuel passages (e.g., 204, 208, 218, 212 a-d) may contain one or more filters, pumps, pressure sensors, temperature sensors, relief valves. The fuel passages may include one or multiple lines. There may be one or more fuel cooling systems. The intake pathway 222 may contain one or more air filters, turbochargers, surge tanks. The engine may contain one or more engine cooling fans, cooling circuits, spark ignitions, valves, and controls. The engine may be coupled to an exhaust pathway.

The specific routines described below in the flowcharts may represent one or more of any number of processing strategies such as event-driven, interrupt-driven, multi-tasking, multi-threading, and the like. As such, various acts or functions illustrated may be performed in the routine illustrated, in parallel, or in some cases omitted. Likewise, the order of processing is not necessarily required to achieve the features and advantages of the example described herein, but is provided for ease of illustration and description. Although not explicitly illustrated, the illustrated acts or functions may be repeatedly performed depending on the particular strategy being used, during engine operation. Further, these figures may graphically represent code to be programmed into the computer readable storage medium in a controller or control system.

FIGS. 3-6 show high-level flowcharts of example routines or sequences for calibrating fuel injectors that may be implemented in a vehicle control system or control unit, such as an engine control unit (ECU), or in a fuel injection system, such as illustrated in FIGS. 1-2.

Figure 3:
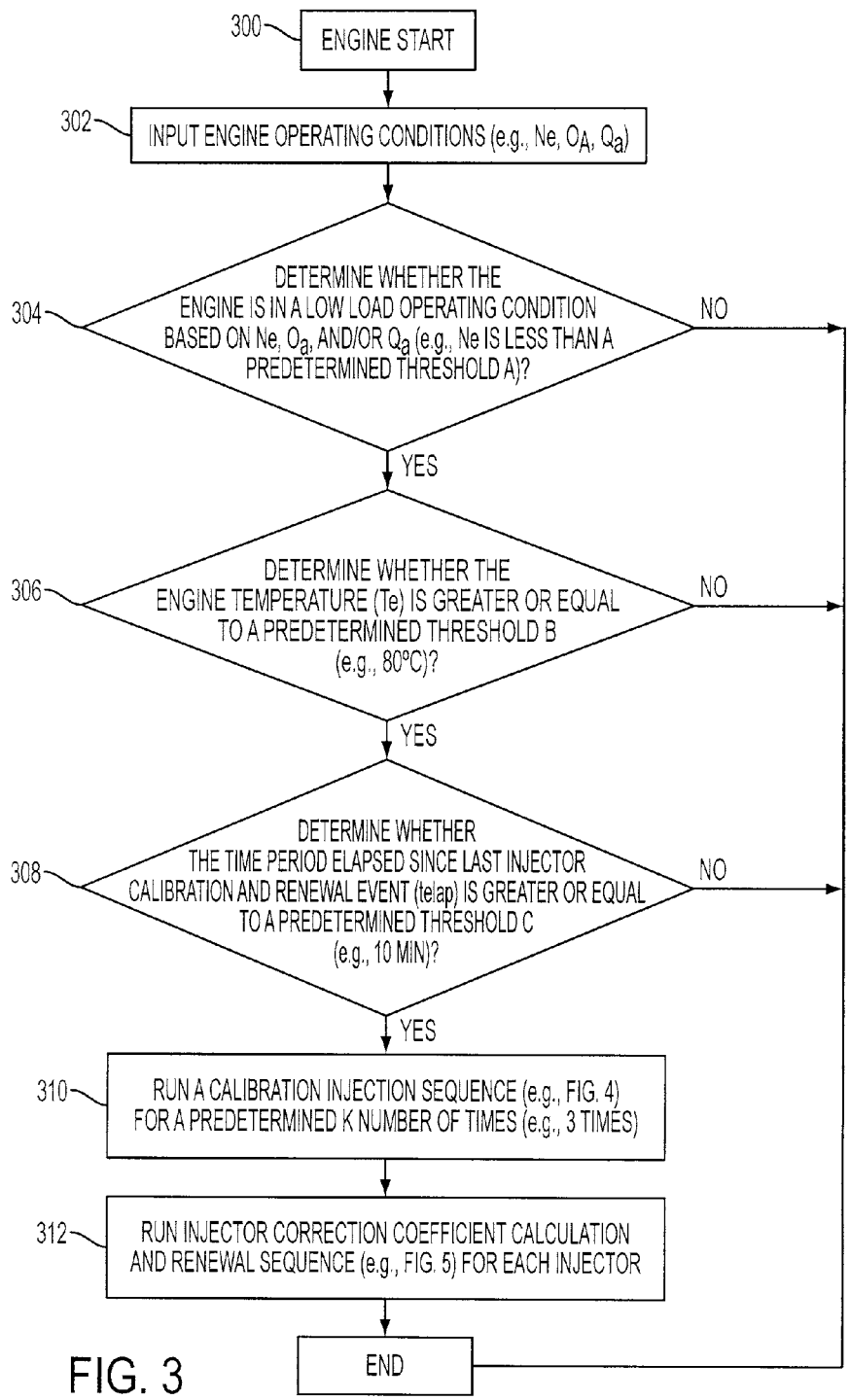
FIG. 3 illustrates an example fuel injector calibration routine.

FIG. 3 illustrates an example fuel injector calibration routine (FICR).

At 302, the control unit (e.g. 12 & 226) receives input signals from various vehicular sensors regarding engine operating conditions. For example, the control unit may receive information from the engine speed sensor (e.g. 242) engine speed signals ($N_e$), from the throttle position sensor (e.g., 238) throttle opening angle signals ($O_A$), and from the mass air flow sensor (e.g., 240) air flow signals ($Q_a$). In some examples, the input signals may include intake charge pressure, the predetermined number of injections to be carried out for injector calibration, and others.

At 304, the control unit determines whether the engine is in a low load operating condition. The control unit may determine that the engine is in a low load operating condition on the basis of $N_e$, $O_a$, and/or $O_a$ (e.g., $N_e$ is less than a predetermined threshold A). If engine is in a low load operating condition, the routine proceeds to step 306, if not, the routine ends.

At 306, the control unit determines whether engine temperature ($T_e$) is greater than or equal to a predetermined threshold B (e.g., 80° C.). The engine temperature may be directly detected via sensors positioned in the engine, or estimated from other sensed signals, for example from the sensed engine coolant temperature, or estimated from or based on various other vehicular parameters. If the engine temperature is greater than or equal to a predetermined threshold B, the routine proceeds to 308, otherwise the routine ends. This step may ensure that injector calibration injection events are carried out when engine temperature has relatively stabilized. Under some conditions, it may be advantageous to avoid or reduce injector calibration during low engine temperature conditions, such as at engine start, since engine temperature may be varying significantly. The fluctuating engine temperature may affect fuel mass injected at a given pressure, and thus generate inaccurate fuel metering, and ultimately degrade calibration results. Alternatively, the calibration may attempt to account for engine temperature, and thus enable calibration over a greater range of operating conditions.

At 308, the control unit determines whether a time period has elapsed ($t_{elap}$) since last injector calibration and a renewal event is greater or equal to a predetermined threshold C (e.g., 10 min). If $t_{elap}$ is greater or equal to threshold C, the routine proceeds to step 310, otherwise the routine ends. In this way, it may be possible to limit or reduce the frequency of injector calibration.

At 310, the control unit runs a calibration injection sequence (e.g., FIG. 4) for a predetermined K number of times (e.g., 3 times). The routine may also predetermine the order in which injectors are to be fired in the calibration injection sequence. It may determine when and how many times each injector may be fired during a calibration injection sequence. It may further include a counting mechanism to keep track of the firing of injectors and make sure injection is cycled through all injectors before proceeding to the next calibration injection sequence. For example for a 4-cylinder engines with 4 injectors, the routine may predetermine that calibration will proceed in the following sequences for a calibration injection sequence: injector #1, #2 #3, #4 and the calibration injection sequence may be repeated 3 times in a fuel injector calibration routine. The routine may also determine that the Fuel Injector Calibration Routine may be repeated after a predetermined amount of time has elapsed (e.g., 10 min) after the conclusion of the last Fuel Injector Calibration Routine. For example, the routine may run a calibration injection routine calibrate the injector #1 at the earliest opportunity, for example after engine start and engine temperature has stabilized, then move on to calibrate the injectors #2, #3, #4 at the next available opportunities. The routine may also determine that the Fuel Injector Calibration Routine may be repeated, for example after a predetermined amount of time (e.g., 10 min) has elapsed since the last calibration cycle, or as needed, such as when a certain triggering event occurs or when engine operating conditions indicate a need to recalibrate the injectors. Examples of such conditions include when engine temperature has changed beyond a predetermined threshold since last Fuel Injector Calibration Routine, or when an exhaust component sensor senses one or exhaust component exceeds predetermined thresholds.

Figure 5:
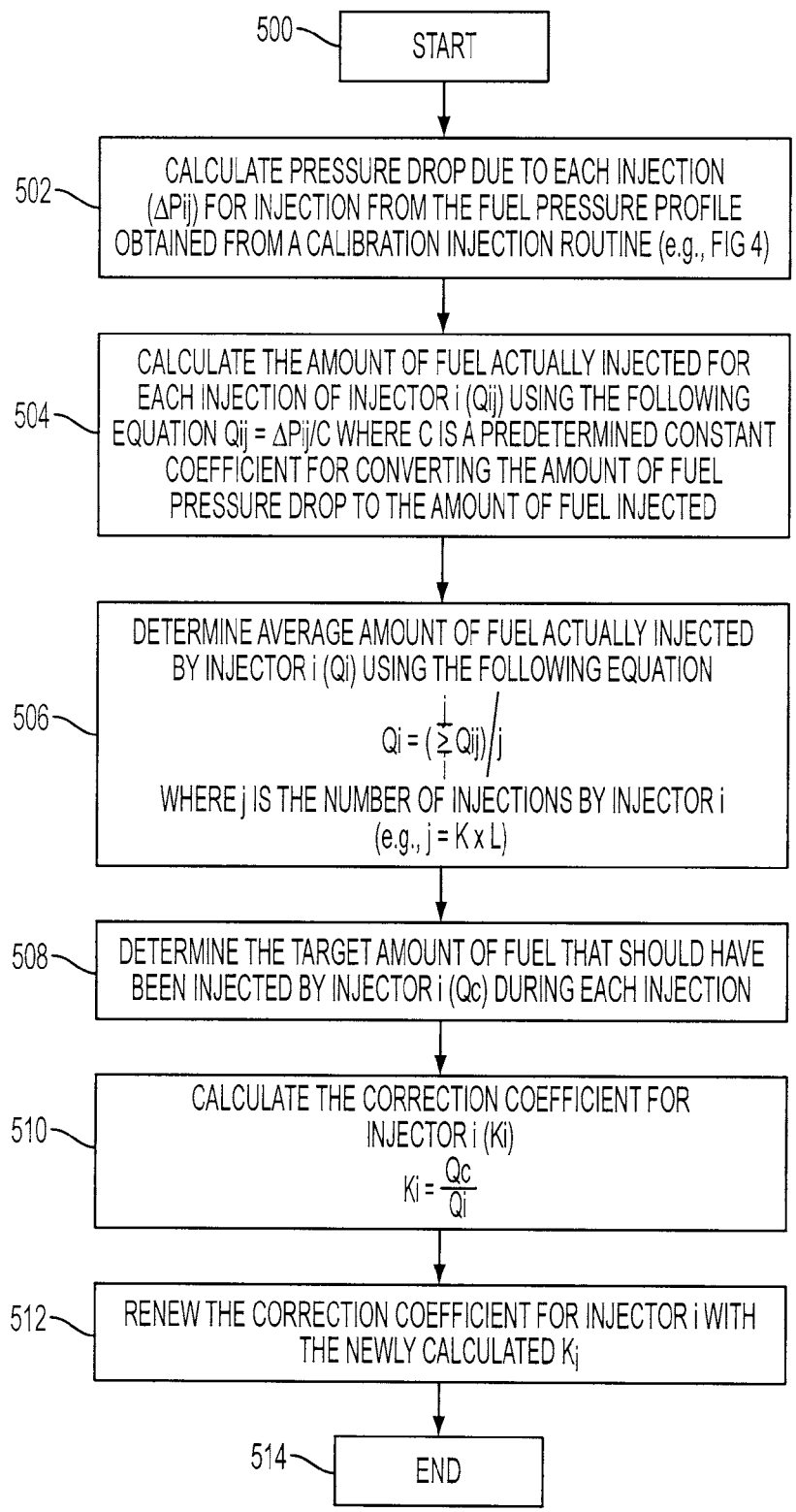
FIG. 5 illustrates an example injector correction coefficient calculation and renewal routine.

At 312, the control unit runs an injector correction coefficient calibration and renewal routine for each injector (e.g., FIG. 5). For example, if the engine is a four cylinder engine and each cylinder has one injector, the injector correction coefficient calibration and renewal routine may be run four times, one for each injector.

Figure 4:
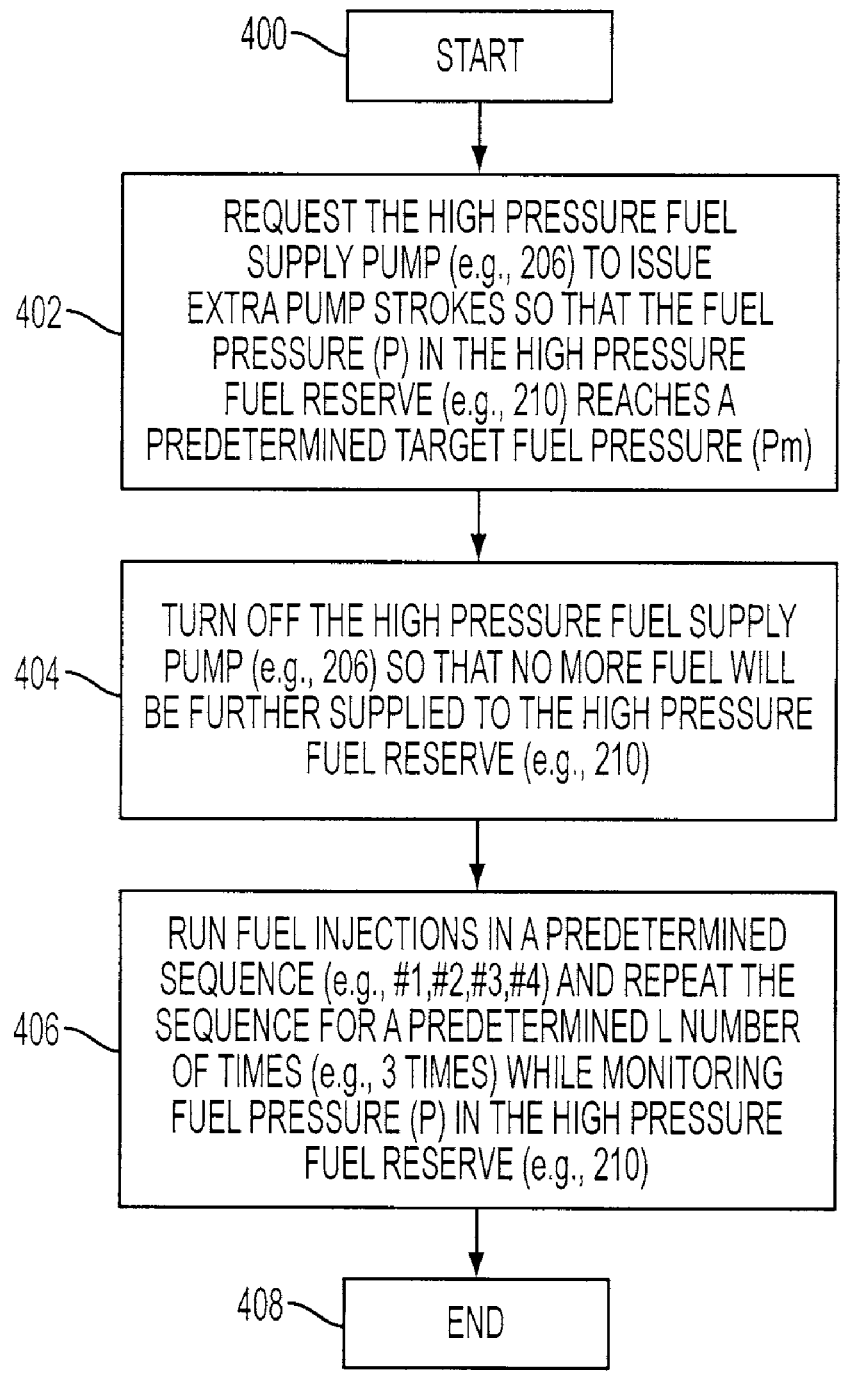
FIG. 4 illustrates an example calibration injection routine.

FIG. 4 is illustrates an example calibration injection routine that may be used as a subroutine for the injector calibration routine (e.g., illustrated in FIG. 3).

Figure 6:
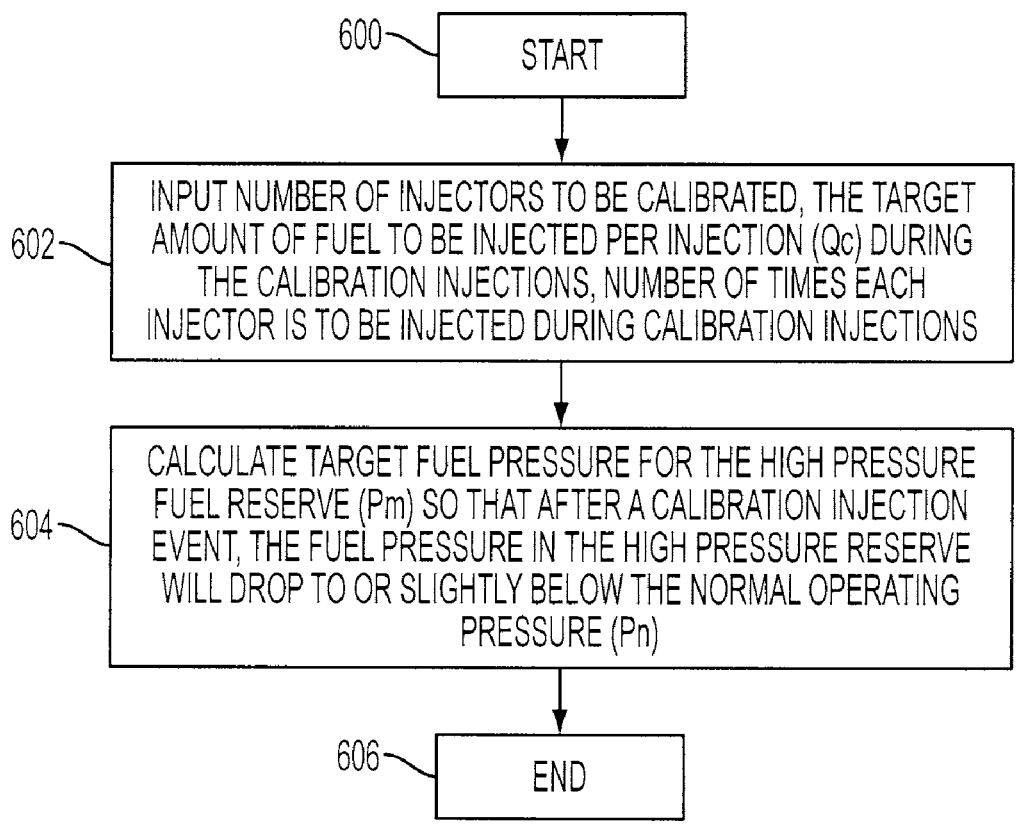
FIG. 6 illustrates an example routine for determining the target calibration pressure ($P_m$) for the high pressure reserve tank.

At 402, the control unit (e.g., 12, 226) requests the high pressure fuel supply pump (e.g., 206) to issue extra pump strokes, increase pump stroke frequency, and/or increase a pump stroke for at least one stroke so that the fuel pressure in the high pressure fuel reserve (e.g., 210) reaches a predetermined target calibration pressure ($P_m$), which is further described with regard to FIG. 6. As described herein, the amount of pump operation increase may be based on engine speed, engine load, boosting operation, intake charge pressure, a number of calibration injections (for the engine, or for each injector) and/or other operating conditions.

At 404, the control unit turns off the high pressure fuel supply pump so that no more fuel will be further supplied to the high pressure fuel reserve (e.g. 210).

At 406, the control unit runs a series of fuel injections in a predetermined sequence (e.g., injector #1, injector #2, injector #3, injector #4, or in a firing order as prescribed for the engine) and repeat the sequence for a predetermined L number of times (e.g., 3 engine cycles, where each injector operates at least once during each engine cycle) while monitoring the fuel pressure (P) profile as a function of time or injection events in the high pressure fuel reserve. The injection series may be scheduled so that at the end of the injections, P reaches or falls below a normal operating target pressure ($P_n$), where $P_n$ is a desired target fuel pressure for the high pressure fuel reserve during normal fuel injection events.

In some examples, the routine may monitor the fuel pressure in the high pressure fuel reserve. In some examples, after a calibration injection sequence is completed, the routine may also return the fuel pressure in the high pressure fuel reserve back to a normal operating target pressure ($P_n$) before the start of the next calibration injection sequence, based on operating conditions, which may include engine operating conditions.

In some examples, the routine may minimize or reduce the number of actuations used to raise fuel pressure in the high pressure fuel reserve to a desired pressure, for example the target calibration pressure ($P_m$), since actuation of the pump increases operating losses. In one particular example, the routine may use a single stroke to increase fuel pressure in the high pressure fuel reserve to achieve the target calibration pressure ($P_m$).

FIG. 5 illustrates an example injector correction coefficient calculation and renewal routine for injector i (e.g., i=1, 2, 3, or 4 for a four cylinder engine) that may be used as a subroutine inside an injector calibration routine (e.g., FIG. 3).

At 502, the control unit calculates fuel pressure drop ($\Delta P_{ij}$) due to each injection by the $i^{th}$ injector (e.g., j=1, 2, 3.9 if each injector is injected 3 times during a calibration injection cycle and the calibration injection cycle is run 3 times during a calibration event). $\Delta P_{ij}$ corresponds to pressure drop in the high pressure fuel reserved due to injection by $i^{th}$ injector during the $j^{th}$ injection.

Various engine operating conditions or events may affect fuel rail pressure measurements and may be taken into consideration when calculating the fuel pressure drop ($\Delta P_{ij}$) attributed to each injection. Therefore, in some examples, the routine may correlate fuel pressure to various engine operating conditions sensed via various sensors (e.g., parameters obtained in 302 of FIG. 3). For example, the transient pressure pulsations generated by injector firing may temporarily affect fuel rail pressure measurement, thus affecting the calibration accuracy. As such, the sampling of the fuel pressure may be selected to reduce the transient effects of injector firing. Additionally, or alternatively, if the injector firing timing is correlated to the fuel rail pressure measurement, temporary pressure drops caused by the injector firing may be taken into consideration when determining injector calibration values. Similarly, intake and/or exhaust valve opening and shutting, intake pressure and/or exhaust pressure, crank angle position, cam position, spark ignition, and engine combustion, may also affect fuel rail pressure measurements and may be correlated to the fuel rail pressure measurements to accurately calculate fuel rail pressure drop attributed to individual injections.

Continuing with FIG. 5, at 504, the control unit calculates an amount of fuel actually injected in each injection $Q_{ij}$, using the following equation, $$Q_{ij} = \Delta P_{ij}/C$$

where C is a predetermined constant coefficient for converting the amount of fuel pressure drop to the amount of fuel injected.

At 506, the control unit determines the average amount of fuel actually injected by injector i ($Q_i$) using the following equation, $$Q_i = (\Sigma_1^j Q_{ij})/j$$

where j is number of injections by injector i (e.g., j=1, 2, 3.9 if each injector is injected 3 times during a calibration injection cycle and the calibration injection cycle is run 3 times during a calibration event).

At 508, the control unit determines the target amount of fuel that should have been injected by injector i ($Q_c$), for example on the basis of engine operating conditions.

At 510, the control unit calculates the correction coefficient for injector i (e.g., i=1, 2, 3, or 4 for a four cylinder engine) using the following equation, $$k_i = Q_c/Q_i$$

At 512, the control unit renews the correction coefficient for injector i with the newly calculated $k_i$. For example, the newly calculated $k_i$ will replace an old $k_i$ stored in a keep alive memory (KAM) of the control unit that may is currently used to calibrate injector i.

FIG. 6 illustrates a routine for determining the target calibration pressure ($P_m$) in the high pressure fuel reserve (e.g., 210).

At 602, the control unit receives an input that provides the number of injectors to be calibrated, the basic amount of fuel or the target amount of fuel to be injected by each injector during each injection ($Q_c$), and no. of times each injector is to be injected during a calibration injection cycle.

At 604, the control unit calculates the target calibration pressure ($P_m$) in the high pressure fuel reserve that is required so that after a calibration injection cycle, the fuel pressure in the high pressure reserve tank will drop back to the target normal operating pressure ($P_n$) for example using the following equation, $$P_m = P_n + \Sigma_1^i (\Sigma_1^j \Delta P_{ij})$$

where $P_n$ is the target normal operating pressure, $\Delta P_{ij}$ is pressure drop during injection j for injector i.

In some examples, the routine may determine the target calibration pressure ($P_m$) based various engine operating conditions or operating conditions. For example, at higher torque, load, and/or engine speed, the fuel quantity injected per injection may be comparatively larger than that at a lower torque or load (or the injection duration may be limited), therefore, the target calibration pressure ($P_m$) may be correspondingly increased, depending on the number of injections to be carried out for a given fuel injector calibration routine. Also when the intake charge pressure is higher, a comparatively larger pressure drop per injection may be used to increase accuracy, and again this translates to a higher target calibration pressure ($P_m$), also depending on the number of injections is to be carried. Thus, in some examples, the engine operating conditions used to determine the target calibration pressure ($P_m$) may include a predetermined number of injections to be carried out for a fuel injector calibration routine. As one example, if the number of predetermined injections for a fuel injector calibration routine increases, the routine may also increases the target calibration pressure ($P_m$).

FIG. 7 is a chart illustrating fuel injection timing, fuel pressure change in the high pressure fuel reserve (e.g., 210), and fuel pump strokes for a prophetic example of a calibration injection cycle (as exemplified by FIG. 4). Prior to a calibration injection cycle, the fuel pressure in the high pressure reserve tank is maintained at the normal target operating pressure ($P_n$) and normal pump strokes are issued. At the start of a calibration injection event, more or larger pump strokes are issued and the fuel pressure in the high pressure fuel reserve tank (P) is allowed to reach the target fuel pressure ($P_m$) which is above $P_n$ and which is determined for example according to a routine illustrated in FIG. 6. During the calibration injection cycle, injections are carried out, for example in sequence for each injector and the fuel pressure (P) inside the high pressure reserve tank is monitored. In this example, each injection has an injection time of τ and target injection amount of $Q_c$. $Q_c$ may be determined from an engine map stored in the ROM of a control unit on the basis of $N_e$, $Q_A$ and/or $O_a$. τ may be determined for example using the following equation, $$\tau = Q_c k_i \sqrt{\frac{P_m}{P}}$$

where $Q_c$ is the target injection amount for each injection, $k_i$ is the correction coefficient for injector i, P is the fuel pressure in the high pressure fuel reserve at the time of the injection, $P_m$ is the target fuel pressure for the high pressure fuel reserve. Since P changes each time an injector injects fuel, τ may vary as a function of time. Since $k_i$ may vary for each injector, τ may also vary as a function of injector.

In an example, injector calibration injection events may be carried out during a low load operation (e.g., <30% of maximum engine load). For each calibration injection event, the fuel rail pressure is raised to a pressure above a normal operating pressure by issuing extra or larger pump strokes, for example to a pressure 10 to 20 bars above the normal operating pressure. Then, fuel injections are carried out until the fuel rail pressure is dropped back to the normal operating pressure. The calibration injection event may be repeated several times. The fuel rail pressure drops due to the fuel injections are monitored during each calibration fuel injection event. A correction coefficient may then be calculated for each cylinder from the average fuel pressure drop caused by each injector per injection. The correction coefficients are stored in keep alive memory (KAM), where the calibration may be carried out several times per vehicle trip.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the routine illustrated, in parallel, or in some cases omitted. Likewise, the order of processing is not necessarily required to achieve the features and advantages of the examples described herein, but are provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method for controlling fuel injection, comprising:
operating a fuel pump to pressurize fuel in a fuel reserve;
increasing output of said fuel pump to increase a fuel pressure in said fuel reserve;
deactivating said fuel pump after increasing said fuel pressure in said fuel reserve;
commanding an equivalent amount of injected fuel from each fuel injector of an engine, the equivalent amount of injected fuel provided from said fuel reserve to the engine; and
individually uniquely correcting amounts of fuel injected from each fuel injector to said engine in response to a pressure drop at said fuel reserve.

2. The method of claim 1 wherein said pressure drop is converted to an amount of fuel injected.

3. The method of claim 1 wherein the fuel pump is temporarily operated with an increased pump stroke frequency, and then operated at a reduced pump stroke frequency for a plurality of pump strokes after operation at said increased pump stroke frequency.

4. The method of claim 1 wherein said fuel pressure is increased during lower engine loads.

5. The method of claim 1 wherein said fuel pressure is increased when an engine throttle opening amount is less than a threshold value.

6. The method of claim 1 further comprising boosting intake air inducted into the engine, and mixing said boosted inducted air with fuel from said fuel injection.

7. The method of claim 1 where said fuel reserve is a fuel rail.

8. The method of claim 1 where said pressure drop is converted to an amount of fuel injected, and where said amount of fuel injected is compared to a desired amount of fuel injected.

9. The method of claim 1 where said injecting fuel from said fuel reserve is performed for a predetermined number of engine cycles.

10. The method of claim 9 where said injecting fuel from said fuel reserve is performed by a direct injector.

11. The method of claim 10 where said fuel pump is a high pressure fuel pump supplying fuel to said direct injector.

12. The method of claim 1 where said fuel pressure in said fuel reserve is determined from a pressure sensor.

13. The method of claim 11 where said high pressure fuel pump is supplied fuel by a low pressure fuel pump.

14. A method for controlling fuel injection, comprising:
operating a fuel pump to provide a first fuel pressure in a fuel reserve;
increasing output of said fuel pump to provide a second fuel pressure in said fuel reserve, said second fuel pressure greater than said first fuel pressure, said second fuel pressure related to a number of fuel injections;
deactivating said fuel pump after providing said second fuel pressure in said fuel reserve;
injecting fuel from said fuel reserve to an engine via a fuel injector; and
correcting an amount of fuel injected to said engine by the fuel injector in response to a sum of a plurality of pressure drops produced by the fuel injector at said fuel reserve.

15. The method of claim 14 where said fuel reserve is a fuel rail.

16. The method of claim 14 where said second fuel pressure is provided in response to engine operating conditions.

17. The method of claim 14 where a plurality of fuel injectors inject fuel to said engine after said second fuel pressure is provided by said fuel pump.

18. The method of claim 14 where said second fuel pressure is provided when an engine temperature is greater than a predetermined threshold.

19. A method for controlling fuel injection, comprising:
operating a fuel pump to pressurize fuel in a fuel reserve;
increasing output of said fuel pump to increase a fuel pressure in said fuel reserve;
deactivating said fuel pump after increasing said fuel pressure in said fuel reserve;
injecting fuel from said fuel reserve to an engine via a fuel injector in a predetermined sequence for a predetermined number of times; and
correcting an amount of fuel injected to said engine by the fuel injector in response to an average of a sum of a plurality of pressure drops produced by the fuel injector at said fuel reserve.

20. The method of claim 19 where said fuel is injected directly into a cylinder of said engine.

* * * * *